United States Patent [19]

Hansen et al.

[11] 4,321,055
[45] Mar. 23, 1982

[54] NAVY DYE MIXTURES AND THEIR USE IN DYEING POLYESTERS

[75] Inventors: Guenter Hansen, Ludwigshafen; Wolf-Dieter Kermer, Fussgoenheim; Hans J. Kolbinger, Gruenstadt, all of Fed. Rep. of Germany

[73] Assignee: BASF Aktiengesellschaft, Ludwigshafen, Fed. Rep. of Germany

[21] Appl. No.: 222,923

[22] Filed: Jan. 6, 1981

[30] Foreign Application Priority Data

Feb. 8, 1980 [DE] Fed. Rep. of Germany ....... 3004654

[51] Int. Cl.³ ............................................. C09B 29/00
[52] U.S. Cl. .......................................... 8/639; 8/695; 8/696; 260/207
[58] Field of Search ............................. 8/639, 695, 696

[56] References Cited
U.S. PATENT DOCUMENTS

| 3,232,693 | 2/1966 | Lanse et al. | 8/639 |
| 3,562,789 | 2/1971 | Sasa et al. | 8/695 |
| 3,621,009 | 11/1971 | Ono et al. | 8/639 |
| 3,955,919 | 5/1976 | Fujii et al. | 8/639 |

FOREIGN PATENT DOCUMENTS

| 54-156875 | 12/1979 | Japan . |
| 978544 | 12/1964 | United Kingdom . |
| 1148672 | 4/1969 | United Kingdom . |
| 1239106 | 7/1971 | United Kingdom . |

OTHER PUBLICATIONS

Chemical Abstracts, vol. 92, No. 18, May 1980, p. 89, Nr. 148443s.

*Primary Examiner*—A. Lionel Clingman
*Attorney, Agent, or Firm*—Oblon, Fisher, Spivak, McClelland & Maier

[57] ABSTRACT

Dye mixtures containing dyes of the formula I

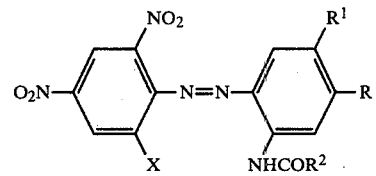

where
X is hydrogen, chlorine or bromine,
$R^1$ is hydrogen, methoxy, ethoxy or phenoxy,
$R^2$ is hydrogen, methyl, ethyl, n-propyl or i-propyl and
R is

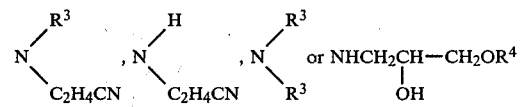

where
$R^3$ is $C_1$–$C_5$-alkyl, allyl, methallyl, crotonyl, prenyl or benzyl,
$R^4$ is unsubstituted or phenyl- or phenoxy-substituted straight-chain or branched $C_1$–$C_8$-alkyl which may be interrupted by 1, 2 or 3 0 atoms, or is $C_3$–$C_5$-alkenyl, unsubstituted or chlorine-, bromine-, $C_1$–$C_4$-alkyl- or $C_1$–$C_4$-alkoxy-substituted phenyl or benzyl,
the mixtures containing not less than 40% of dyes wherein R is

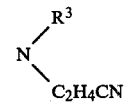

or $NHC_2H_4CN$, from 0 to 20% of one or more dyes wherein R is

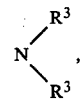

and from 10 to 60% of one or more dyes wherein R is

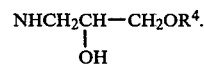

3 Claims, No Drawings

NAVY DYE MIXTURES AND THEIR USE IN DYEING POLYESTERS

The present invention relates to dye mixtures, containing dyes of the formula I

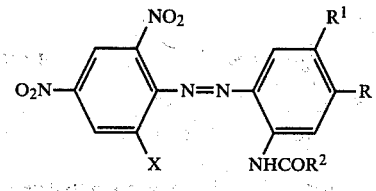

where
X is hydrogen, chlorine or bromine,
$R^1$ is hydrogen, methoxy, ethoxy or phenoxy,
$R^2$ is hydrogen, methyl, ethyl, n-propyl or i-propyl and
R is

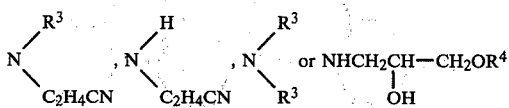

where
$R^3$ is $C_1$-$C_5$-alkyl, allyl, methallyl, crotonyl, prenyl or benzyl,
$R^4$ is unsubstituted or phenyl- or phenoxy-substituted straight-chain or branched $C_1$-$C_8$-alkyl which may be interrupted by 1, 2 or 3 O atoms, or is $C_3$-$C_5$-alkenyl, unsubstituted or chlorine-, bromine-, $C_1$-$C_4$-alkyl- or $C_1$-$C_4$-alkoxy-substituted phenyl or benzyl, the mixtures containing not less than 40% of dyes wherein R is

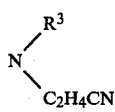

or $NHC_2H_4CN$, from 0 to 20% of one or more dyes wherein R is

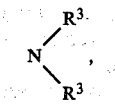

and from 10 to 60% of one or more dyes wherein R is

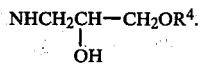

The dye mixtures may be prepared by mixing the individual components mechanically, or by carrying out a mixed coupling reaction. Details of the method of preparation may be found in the Examples, where parts and percentages are by weight, unless stated otherwise.

The novel dye mixtures are distinguished by excellent tinctorial properties, in particular by essentially temperature-independent uptake, good bath exhaustion, good build-up, so that very deep colors can be achieved, and very high tinctorial strength. The fastness characteristics of the dyeings substantially correspond to those of the individual components.

Preferred mixtures contain
(a) from 10 to 75% of dyes of the formula I, wherein R is

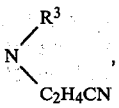

(b) from 0 to 75% of dyes of the formula I, wherein R is

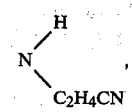

(c) from 10 to 60% of dyes of the formula I, wherein R is

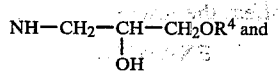

(d) from 0 to 20% of dyes of the formula I, wherein R is

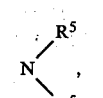

$R^5$ being $C_1$-$C_5$-alkyl or allyl, components (a) and (b) jointly accounting for not less than 40% of the mixture.

Dye mixtures of particular industrial importance contain dyes of the formula II

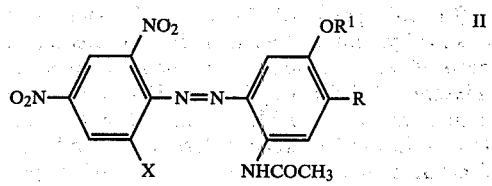

where X and $R^1$ have the stated meanings, the mixture consisting of from 40 to 85% of one or more dye pairs of the formula II, wherein R is

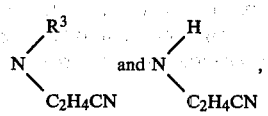

whilst X and $R^1$ have the same meanings for each member of the pair, from 0 to 20% of dyes of the formula II, wherein R is

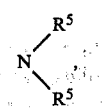

and from 15 to 60% of dyes of the formula II, wherein R is

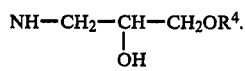

The dye mixtures may, due to the method of synthesis, contain yet further minor components; in particular, the dyes of the formulae I and II, wherein R is

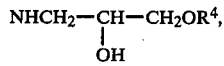

as a rule contain small amounts of the isomeric dyes of the formulae I and II, respectively, wherein R is

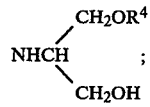

this does not affect the results.

EXAMPLE 1

(a) 262 parts of 6-bromo-2,4-dinitroaniline are introduced into 2,000 parts of concentrated sulfuric acid. 320 parts of nitrosylsulfuric acid (containing 11.5% of $N_2O_3$) are run in slowly at 5°–15° C., whilst stirring and cooling the mixture, and stirring is then continued at 10°–15° C. for not less than 3 hours.

(b) 301 parts of 2-[N-3'-methyl-but-2'-enyl-N-β-cyanoethyl-amino]-4-acetanisidine are dissolved in 450 parts of warm acetic acid and the solution is added to a mixture of 2,000 parts of water, 300 parts by volume of concentrated hydrochloric acid, 10 parts of amidosulfonic acid and 10 parts of a diisobutylnaphthalene-1-sulfonic acid mixture (isomers in respect of the position of the isobutyl groups). 4,000 parts of ice are added and the diazonium salt solution prepared under (a) is run in slowly at from −5° to +3° C., with thorough stirring. The reaction is completed by adding sodium acetate or sodium formate until the pH is 3. The dye obtained is filtered off at room temperature or above, washed neutral and salt-free with water, and dried. About 520 parts of a violet-black powder of the formula

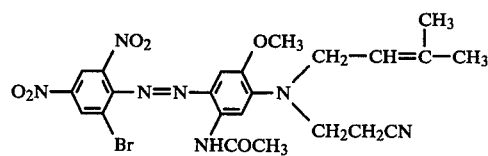

are obtained; this product gives blue dyeings, having good lightfastness, washfastness and fastness to thermofixing and perspiration, on polyester fibers. However, the build-up of the dye is poor, and the depth of color is very dependent on the temperature in the dyebath in the range from 120° to 140° C.

(c) Using a method similar to Example 1(b), 233 parts of 2-(N-β-cyanoethyl-amino)-4-acetanisidine give 460 parts of the dye of the formula

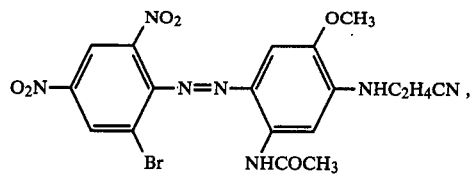

which gives bluish violet dyeings on polyester fibers, the depth of color being poor.

(d) Using a method similar to Example 1(b), 236 parts of 2-diethylamino-4-acetanisidine give 365 parts of the dye of the formula

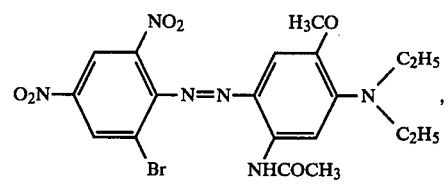

which produces greenish blue hues on polyester fibers.

(e) Using a method similar to Example 1(b), 310 parts of 2-(3'-n-butoxy-2'-hydroxy-propyl-amino)-4-acetanisidine give about 510 parts of the dye of the formula

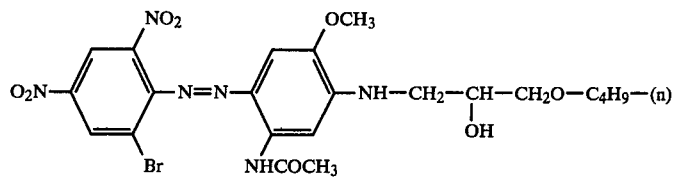

which produces greenish navy hues on polyester fibers.

(f) A polyester fabric is dyed by the HT method, using a dye mixture which consists of 20 parts of the dye prepared under 1(b), 40 parts of the dye prepared under 1(c), 10 parts of the dye prepared under 1(d) and 30 parts of the dye prepared under 1(e). Advantageously, the dye mixture is employed as a finely dispersed formulation containing a dispersant.

Deep and level navy dyeings with good fastness characteristics are obtained. Within the HT range of 125°–135° C., the depth of color is only slightly temperature-dependent. Even when used for deep navy dyeings, the dye mixture shows good bath exhaustion and good build-up.

EXAMPLE 2

262 parts of 6-bromo-2,4-dinitro-aniline are diazotized as described under 1 (a) and the product is coupled, similarly to 1 (b), with a mixture of 56.7 parts of 2-[N-3'-methyl-but-2'-enyl-N-β-cyanoethyl-amino]-4-acetanisidine, 99.6 parts of 2-(N-β-cyanoethyl-amino)-4-acetanisidine, 25.1 parts of 2-diethylamino-4-acetanisidine and 86.2 parts of 2-(3'-n-butoxy-2'-hydroxy-propylamino)-4-acetanisidine.

A mixed dye, which corresponds, in chemical composition, to the mechanical mixture prepared in Example 1(f), is obtained.

The mixed dye is converted to a dye formulation by conventional methods, and the formulation is used to dye polyesters. The dyeing results achieved are the same as in Example 1(f).

EXAMPLE 3

A polyester fabric is dyed with a mixture of 50 parts of the dye of Example 1(c), 20 parts of the dye of the formula

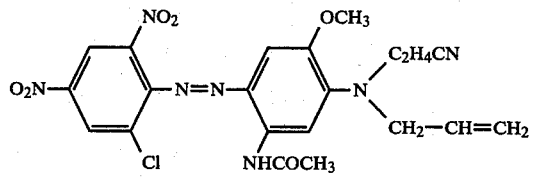

and 30 parts of the dye of the formula

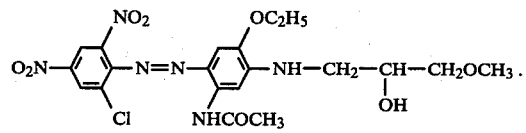

Deep, level, very fast navy dyeings are obtained. The mixture exhibits good build-up even when used for navy hues.

Temperature fluctuations or pH fluctuations in the dyebath during the HT process have little influence on the hue and depth of color.

EXAMPLE 4

217.5 parts of 6-chloro-2,4-dinitro-aniline are diazotized similarly to Example 1(a) and coupled, similarly to Example 1(b), with a mixture of 136.5 parts of 2-(N-allyl-N-$\beta$-cyanoethyl-amino)-4-acetanisidine, 112.2 parts of 2-(3'-phenoxy-2'-hydroxy-propylamino)-4-acetanisidine and 42.9 parts of 2-(3'-methoxy-2'-hydroxypropyl-amino)-4-acetanisidine.

475 parts of a dark dye powder are obtained; the product gives navy dyeings, which are very lightfast, washfast and fast to perspiration and thermofixing, on polyester fibers. The dye mixture has good tinctorial properties, in particular good build-up and little temperature-dependence of dye uptake in the range from 125° to 135° C.

The dye mixtures listed in the Table which follows are obtained similarly to Examples 1 to 4 and show similar tinctorial properties.

| Example | % | X | $R^1$ | $R^2$ | R | Product prepared similarly to Example |
|---|---|---|---|---|---|---|
| 5 | 20 | Cl | $CH_3$ | $CH_3$ | $N(CH_2CH=CH_2)(CH_2CH_2CN)$ | 2 |
|   | 50 | " | " | " | $NHCH_2CH_2CN$ | (mixed coupling) |
|   | 30 | " | " | " | $NH-CH_2-CH(OH)-CH_2OC_4H_9$ |   |
| 6 | (Mole %) |   |   |   |   |   |
|   | 25 | Cl | $CH_3$ | $CH_3$ | $N(CH_2CH=CH_2)(CH_2CH_2CN)$ |   |
|   | 25 | Br | " | " |   |   |
|   | 17 | Cl | " | " | $NH-CH_2CH(OH)-CH_2OC_6H_5$ | 2 |
|   | 17 | Br | " | " |   |   |
|   | 8 | Cl | " | " | $NH-CH_2CH(OH)-CH_2OCH_3$ |   |
|   | 8 | Br | " | " |   |   |
| 7 | (% by weight) |   |   |   |   |   |
|   | 20 | Cl | $CH_3$ | $CH_3$ | $N(CH_2CH=CH_2)(CH_2CH_2CN)$ |   |
|   | 45 | " | " | " | $NHCH_2CH_2CN$ | mixed coupling (3 components) |
|   | 25 | " | " | " | $NH-CH_2-CH(OH)-CH_2OC_4H_9$ |   |
|   | 10 | Br | " | " | $N(C_2H_5)_2$ | 4th component admixed mechanically |
| 8 | 35 | Cl | $CH_3$ | $CH_3$ | $N(CH_2-CH=CH_2)(CH_2-CH_2CN)$ |   |
|   | 20 | " | " | " | $NHCHCH_2CN$ | 7 |
|   | 25 | " | " | " | $NH-CH_2-CH(OH)-CH_2OC_4H_9$ |   |
|   | 20 | Br | " | " | $N(C_2H_5)_2$ |   |

-continued

| Example | % | X | R¹ | R² | R | Product prepared similarly to Example |
|---|---|---|---|---|---|---|
| 9 | 60 | Br | $CH_3$ | $CH_3$ | $N(CH_2CH=CH_2CH_3)(CH_2CH_2CN)$ | |
| | 10 | " | " | " | $NHCH_2CH_2CN$ | |
| | 20 | " | " | " | $NH-CH_2-CH(OH)-CH_2OC_2H_4OC_2H_5$ | 7 |
| | 10 | Cl | $C_2H_5$ | $CH_3$ | $N(C_2H_5)_2$ | |
| 10 | 50 | Br | $CH_3$ | $CH_3$ | $N(CH_2CH=CH_2)(C_2H_4CN)$ | |
| | 20 | " | " | " | $NHCH_2CH_2CN$ | 2 |
| | 25 | " | " | " | $NH-CH_2-CH(OH)-CH_2OCH_2-CH=CH_2$ | |
| | 5 | " | " | " | $N(CH_2-CH=CH_2)_2$ | |
| 11 | 70 | Br | $CH_3$ | $CH_3$ | $N(C_2H_5)(CH_2CH_2CN)$ | |
| | 10 | " | " | " | $NHCH_2CH_2CN$ | 2 |
| | 15 | " | " | " | $NH-CH_2-CH(OH)-CH_2-O-CH_2-CH(C_2H_5)-(CH_2)_3-CH_3$ | |
| | 5 | " | " | " | $N(C_4H_9)_2$ | |
| 12 | 30 | Br | $C_2H_5$ | $CH_3$ | $N(CH_2-CH=CH_2)(CH_2CH_2CN)$ | |
| | 40 | Cl | $CH_3$ | " | $NHCH_2CH_2CN$ | 1 |
| | 20 | " | " | " | $NH-CH_2-CH(OH)-CH_2-O-CH_2-C_6H_5$ | |
| | 10 | " | $C_2H_5$ | " | $N(C_4H_9)_2$ | |
| 13 | 50 | Br | $CH_3$ | $CH_3$ | $N(CH_2-C(CH_3)=CH_2)(CH_2CH_2CN)$ | |
| | 20 | " | " | " | $NHCH_2CH_2CN$ | 1 |
| | 20 | Cl | " | " | $NHCH_2CH(OH)-CH_2OC_2H_4OC_2H_4OCH_3$ | |
| | 10 | Br | " | $C_2H_5$ | $N(CH_3)_2$ | |
| 14 | 35 | Br | $CH_3$ | $CH_3$ | $N(C_2H_5)(C_2H_4CN)$ | |
| | 5 | Br | " | " | $NHCH_2CH_2CN$ | 2 |
| | 40 | " | " | " | $NH-CH_2-CH(OH)-CH_2OC_6H_5$ | |
| | 20 | " | " | " | $NH-CH_2-CH(OH)-CH_2OC_4H_9$ | |
| 15 | 20 | Cl | $CH_3$ | $CH_3$ | $N(C_5H_{11})(C_2H_4CN)$ | |
| | 20 | " | " | " | $NHCH_2CH_2CN$ | 2 |
| | 40 | " | " | " | $N(CH_2-CH=CH_2)(CH_2CH_2CN)$ | |
| | 20 | " | " | " | $NH-CH_2-CH(OH)-CH_2OC_4H_9$ | |

-continued

| Example | % | X | R¹ | R² | R | Product prepared similarly to Example |
|---|---|---|---|---|---|---|
| 16 | 50 | Cl | CH₃ | CH₃ | $\mathrm{N}\begin{array}{l}-\mathrm{C_4H_9}\\-\mathrm{C_2H_4CN}\end{array}$ | |
| | 25 | " | " | " | NH—CH₂—CH(OH)—CH₂OC₆H₅ | 2 |
| | 25 | " | " | " | NH—CH₂—CH(OH)—CH₂OCH₃ | |
| 17 | 60 | Cl | CH₃ | CH₃ | $\mathrm{N}\begin{array}{l}-\mathrm{CH_3}\\-\mathrm{CH_2CH_2CN}\end{array}$ | |
| | 10 | Cl | " | " | NHCH₂CH₂CN | 1 |
| | 30 | Br | C₂H₅ | " | NH—CH₂—CH(OH)—CH₂OC₅H₁₁ | |
| 18 | 70 | Br | CH₃ | CH₃ | $\mathrm{N}\begin{array}{l}-\mathrm{CH_2-C_6H_5}\\-\mathrm{CH_2CH_2CN}\end{array}$ | |
| | 10 | " | " | " | NHCH₂CH₂CN | 1 |
| | 20 | Cl | C₂H₅ | " | NH—CH₂—CH(OH)—CH₂—OC₆H₅ | |
| 19 | 20 | Cl | CH₃ | CH₃ | $\mathrm{N}\begin{array}{l}-\mathrm{CH_2-C_6H_5}\\-\mathrm{CH_2CH_2CN}\end{array}$ | |
| | 50 | " | " | " | NHCH₂CH₂CN | 2 |
| | 30 | " | " | " | NH—CH₂—CH(OH)—CH₂—OC₄H₉ | |
| 20 | 15 | Cl | CH₃ | CH₃ | $\mathrm{N}\begin{array}{l}-\mathrm{C_6H_5}\\-\mathrm{CH_2CH_2CN}\end{array}$ | |
| | 50 | Br | " | " | $\mathrm{N}\begin{array}{l}-\mathrm{CH_2-CH=CH_2}\\-\mathrm{CH_2CH_2CN}\end{array}$ | |
| | 5 | " | " | " | NHCH₂CH₂CN | 1 |
| | 25 | Cl | " | " | NH—CH₂CH(OH)—CH₂OC₄H₉ | |
| | 5 | Br | " | " | N(C₂H₅)₂ | |
| 21 | 60 | Br | CH₃ | H | $\mathrm{N}\begin{array}{l}-\mathrm{CH_2-CH=CH_2}\\-\mathrm{CH_2CH_2CN}\end{array}$ | |
| | 10 | " | " | " | NHCH₂CH₂CN | 2 |
| | 30 | " | " | CH₃ | NH—CH₂—CH(OH)—CH₂OC₂H₄OC₂H₅ | |
| 22 | 20 | Cl | CH₃ | CH₃ | $\mathrm{N}\begin{array}{l}-\mathrm{CH_2-CH=CH_2}\\-\mathrm{C_2H_4CN}\end{array}$ | |
| | 50 | " | " | " | NHCH₂CH₂CN | 2 |
| | 30 | " | " | H | NH—CH₂—CH(OH)—CH₂OC₄H₉ | |
| 23 | 30 | Br | C₂H₅ | CH₃ | $\mathrm{N}\begin{array}{l}-\mathrm{CH_2-CH=CH_2}\\-\mathrm{C_2H_4CN}\end{array}$ | |
| | 45 | " | " | " | NHCH₂CH₂CN | 2 |
| | 25 | " | CH₃ | " | NH—CH₂—CH(OH)—CH₂OC₂H₄OC₆H₅ | |

-continued

| Example | % | X | $R^1$ | $R^2$ | R | Product prepared similarly to Example |
|---|---|---|---|---|---|---|
| 24 | 45 | Br | $CH_3$ | $CH_3$ | $N(CH_2CH=CH_2)(C_2H_4CN)$ | |
|  | 30 | " | " | " | $NHCH_2CH_2CN$ | 1 |
|  | 25 | Cl | $C_2H_5$ | " | $NH-CH_2-CH(OH)-CH_2O-C_6H_4-Cl$ | |
| 25 | 55 | Cl | $CH_3$ | $CH_3$ | $N(CH_2-CH=CH_2)(CH_2CH_2CN)$ | |
|  | 10 | " | " | " | $N(CH_3)(CH_2CH_2CN)$ | 7 |
|  | 10 | " | " | " | $NHCH_2CH_2CN$ | |
|  | 25 | Br | " | " | $NH-CH_2-CH(OH)-CH_2O-C_6H_4-OCH_3$ | |
| 26 | 45 | Br | $CH_3$ | $CH_3$ | $N(C_2H_5)(CH_2CH_2CN)$ | |
|  | 15 | " | " | " | $NHCH_2CH_2CN$ | 2 |
|  | 20 | " | " | " | $NH-CH_2-CH(OH)-CH_2O-C_6H_4-CH_3$ | |
|  | 20 | " | " | " | $NH-CH_2-CH(OH)-CH_2OC_4H_9$ | |

We claim:

1. A navy dye mixture, containing dyes of the formula I

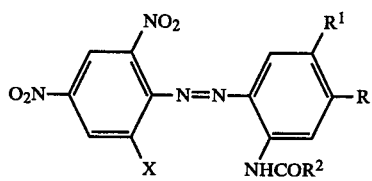

where
X is hydrogen, chlorine or bromine,
$R^1$ is hydrogen, methoxy, ethoxy or phenoxy,
$R^2$ is hydrogen, methyl, ethyl, n-propyl or i-propyl and
R is

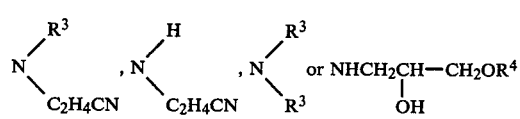

where
$R^3$ is $C_1$-$C_5$-alkyl, allyl, methallyl, crotonyl, prenyl or benzyl,
$R^4$ is unsubstituted or phenyl- or phenoxy-substituted straight-chain or branched $C_1$-$C_8$-alkyl which may be interrupted by 1, 2 or 3 O atoms, or is $C_3$-$C_5$-alkenyl, unsubstituted or chlorine-, bromine-, $C_1$-$C_4$-alkyl- or $C_1$-$C_4$-alkoxy-substituted phenyl or benzyl, the mixture containing not less than 40% of dyes wherein R is

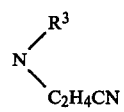

or $NHC_2H_4CN$, from 0 to 20% of one or more dyes wherein R is

and from 10 to 60% of one or more dyes wherein R is

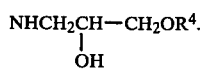

2. The navy dye mixture of claim 1, wherein said mixture contains 20 parts of the dye of the formula

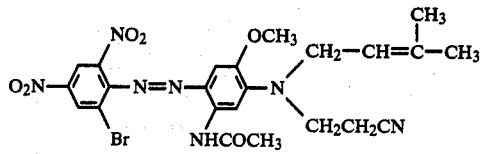
40 parts of the dye of the formula
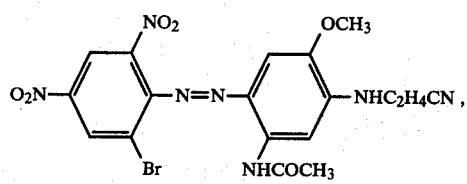
10 parts of the dye of the formula
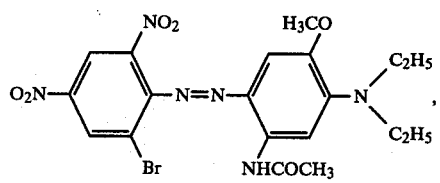
and 30 parts of the dye of the formula
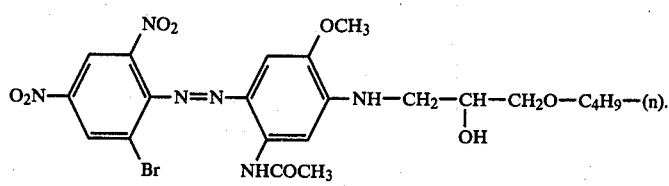
3. The dye mixture of claim 1 wherein said mixture contains 50 parts of the dye of the formula
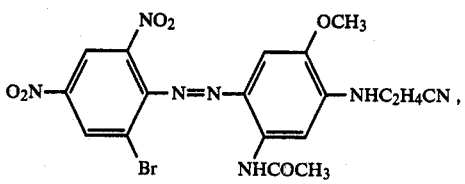
20 parts of the dye of the formula
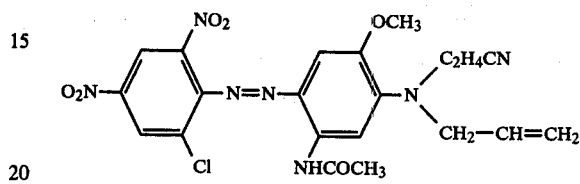
and 30 parts of the dye of the formula
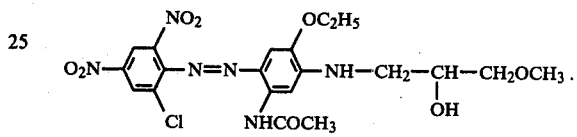
* * * * *